(12) United States Patent
McKeown

(10) Patent No.: US 7,299,312 B2
(45) Date of Patent: Nov. 20, 2007

(54) TELECOMMUNICATION APPARATUS

(75) Inventor: Shane McKeown, Fife (GB)

(73) Assignee: Agilent Technologies, Inc., Santa Clara, CA (US)

( * ) Notice: Subject to any disclaimer, the term of this patent is extended or adjusted under 35 U.S.C. 154(b) by 245 days.

(21) Appl. No.: 10/939,088

(22) Filed: Sep. 10, 2004

(65) Prior Publication Data

US 2006/0059290 A1   Mar. 16, 2006

(51) Int. Cl.
G06F 13/24 (2006.01)
H05K 1/00 (2006.01)
H05K 7/00 (2006.01)

(52) U.S. Cl. .................... 710/260; 710/302; 439/78; 361/760

(58) Field of Classification Search ............... 710/300, 710/301, 302, 305, 313; 439/78, 79, 82, 439/445, 572; 361/752, 760, 788
See application file for complete search history.

(56) References Cited

U.S. PATENT DOCUMENTS 6,392,142 B1 * 5/2002 Uzuka et al. ............... 174/541
6,425,027 B1 * 7/2002 Mills et al. ................. 710/300
6,578,103 B1 * 6/2003 Hill et al. ................... 710/313
6,965,959 B2 * 11/2005 Linares et al. .............. 710/300
7,000,053 B2 * 2/2006 Ho et al. .................... 710/302
2002/0085361 A1 * 7/2002 Wachel ....................... 361/803
2003/0086550 A1 * 5/2003 Hershkovits et al. .. 379/221.03

OTHER PUBLICATIONS

CompactPCI Short Form Specification, PICMG, Nov. 1, 1995.*
IEEE Standard 1101.11, May 21, 1998.*
CompactPCI and Computer Telephony, Joe Pavlat, CompactPCI Systems, 1997.*
Adaptors for Network Technology, Teletekno Oy, 2000.*
Definition of Eurocard from Wikipedia, undated.*
Definition of BNC connector from Wikipedia, undated.*

* cited by examiner

Primary Examiner—Khanh Dang

(57) ABSTRACT

A transition module using an input/output (I/O) bus interface can be connected to a backplane having a bus connector. The transition module is provided with an external connector for receiving an input signal, an interface circuit coupled to the external connector and a processing unit for carrying out initial filtering and processing of the input signal before coupling the signal to a processor card connected to the backplane via the I/O bus interface and the bus connector.

14 Claims, 3 Drawing Sheets

TELECOMMUNICATION APPARATUS

BACKGROUND OF THE INVENTION

The present invention relates to apparatus used in telecommunications, in particular to modularised network cards which are coupled to backplanes; and more particularly to a card having increased functionality.

Worldwide today, substantial demands are being placed on modern telecommunication networks by the increase in the numbers of telephone lines, pages, fax machines and subscribers to other data systems, such as the Internet. This increased demand is placing ever increasing pressure on telecommunication service operators to achieve greater throughput whilst achieving the so-called "five nines" operational availability (i.e., 99.999% up time) as well as provide the capability to support future functionality or features whilst keeping costs to a minimum. In telecommunication networks, service operators employ exchange rooms which have high-densities of high-power networking and processing equipment, which are all housed in a mechanical chassis. Many challenging considerations arise from having such a tightly packed arrangement of high-power equipment, including the need for specialist cooling systems, cabling arrangements and ease of maintenance. The "five nines" operational availability and other service level agreements (SLA's) impose great demands on network maintenance and the so-called "hot-swap" technology employed in equipment housed in a chassis allows faulty cards to be easily replaced.

Typically the mechanical chassis houses the electronic equipment which carries out networking and processing of routed data signals. The data signals may be transmitted on either electrical cables or optical fibre cables, which are often arranged around and supported by the outside of the chassis. The cables are plugged into the electronic equipment contained in the chassis. Often a series of cables will be plugged into a single modularised network card and a series of cards may be layered within a chassis. The modularised network cards are connected by a backplane. Typically a backplane is a printed circuit board which contains slots or sockets into which modularised cards, other electronic circuit boards and/or cables can be plugged. Typically, backplanes have front and rear sides and provide a physical connection between an interface processor or modularised card, the data signals and power distribution buses, all housed within the chassis.

The cabling issues associated with such densely laid out equipment can provide many challenges. The cables should be easy to replace and readily accessible whilst not being pulled across other pieces of equipment as this can limit accessibility. The cables should also be as short as possible to reduce cost and increase performance. Both electrical and optical fibre cables are restricted in how far they can be bent since this can cause stress, loss, and fatigue in the cable which may eventually,lead to down time of the network. It can often therefore be desirable to connect cables only to the rear of cards contained within a chassis in order to improve the maintainability.

Compact Peripheral Component Interconnect (cPCI) is an adaptation of the Peripheral Component Interconnect (PCI) which is an international standard specification for industrial computer applications. cPCI is often used for small, high-speed industrial computing applications where transfers occur between a number of high-speed cards. cPCI provides a way for rear cabling through the use of Rear Transition Modules (RTMs). Typically the RTM provides a connector to terminate an external cable and interface devices, recover the signal and convert it to digital format. In known modularised processing cards, an interface between an incoming signal and a hardware processor and filter is required, this is known as the interface circuit. The signal may then be converted into a digital format by the hardware processor before being transmitted to a host processor on a front card for further processing.

Typically an RTM connects to a Front processor card through a J3 or J5 connector. J3 and J5 connectors are standard connectors known in the art. However the use of these connectors is not mandated by Compact PCI and can be specific to the design of a processor card and RTM. Therefore, known RTMs can have limited functionality since they may only be compatible with one type of processor card. It is often however, desirable to have compatibility with any kind of commercially available front processor card. Since no pins are defined for power and ground in J3 and J5 connectors, known RTMs must derive power from the front processor card, but the pins used for power and ground are custom.

Another means for facilitating rear cabling can be provided by a PCI mezzanine card (PMC) which connects to a PMC site located on the front processor card. A PMC is a board that can be plugged into a standard interface on the front processor card. The hardware processing can be performed on the PMC but an RTM may still only be compatible with its mating PMC card. Both PMC and known RTMs do not necessarily support "hot-swap" technology.

An alternative to the use of RTMs with a standard PMC card is the use of a PMC card which contains the interface circuit. The external interface to the PMC card is through the front of the card cage and whilst no RTM is required, other problems may arise with this connectivity from the use of PMC cards. For example the orientation of PMC cards, i.e. connected into a slot on the front processor card and being parallel with the card can be unfavourable to the thermal behaviour of the module since the PMC card dissipates heat and can block the air flow in the chassis which may lead to the processor overheating. Furthermore, the external connection is to the front of the card cage and often it is desirable to connect to the rear of the card cage.

SUMMARY OF THE INVENTION

Accordingly, in a first aspect, the invention provides a rear panel transition module having a compact Peripheral Component Interconnect (cPCI) input/output (I/O) bus interface for connection to a rear side of a backplane conforming to the cPCI bus standard and having a cPCI bus connector, the rear panel transition module further comprising an external connector having an input for receiving input signals, an interface circuit coupled to the external connector, and at least one processing unit coupled between the interface circuit and the cPCI I/O bus interface.

The rear panel transition module may further comprise a controller to support live insert functionality (hot-swap). The external connector may be any one of BNC, D-type or SC/FC. The at least one processing unit can perform initial filtering and/or processing of a signal input.

According to a second aspect, the invention provides a transition module having an input/output (I/O) bus interface coupled to a connector for connection to a backplane having a bus connector, the transition module further comprising an external connector having an input for receiving input signals, an interface circuit coupled to the external connector, and at least one processing unit coupled between the interface circuit and the I/O bus interface.

According to a another aspect, the invention provides a modularised card apparatus comprising a backplane having a rear side and a front side and conforming to the cPCI bus standard, the backplane having a cPCI bus connector, the modularised card apparatus further comprising a front processing card having a processing unit and a first cPCI input/output (I/O) bus interface for connecting to a slot on the front side of the backplane, a rear transition module comprising a second cPCI I/O bus interface for connecting to a rear slot on the rear side of the backplane, the rear transition module further comprising an external connector having an input for receiving input signals, an interface circuit coupled to the external connector, and at least one processing unit coupled between the interface circuit and the second cPCI I/O bus interface.

The front processing card conveniently has no external connection provided thereon. The cPCI bus connector on the backplane may be a feed-through connector.

The rear transition module can further comprise a resistive electrical connection between an IDSEL input on the second cPCI I/O bus interface and an appropriate address line. Assignment of interrupt signals may be carried out on the rear transition module. A resistive electrical connection may be provided on the rear transition module between an INTA# pin on the second cPCI I/O bus interface and an INTD# pin on the rear side of the backplane.

The backplane can comprise a plurality of slots on the rear side. An IDSEL input on the second cPCI I/O bus interface may be connected to an appropriate address line via a resistive electrical connection provided on the backplane The IDSEL pin on the first cPCI I/O bus interface is connected to a ground plane.

According to a further aspect, the invention provides a modularised card apparatus comprising a backplane having a first side and a second side, the backplane having a bus connector, the modularised card apparatus further comprising a processing card having a processing unit and a first input/output (I/O) bus interface for connecting to a slot on the second side of the backplane, a transition module comprising a second I/O bus interface coupled to a connector for connecting to a slot on the first side of the backplane, the transition module further comprising an external connector having an input for receiving input signals, an interface circuit coupled to the external connector, and at least one processing unit coupled between the interface circuit and the second I/O bus interface.

Thus, the telecommunications apparatus according to at least some embodiments of the present invention, provides an external connecting means which can support "hot-swap" technology, be compatible with any commercial processor, have good thermal performance and allow cabling to the rear of the chassis.

BRIEF DESCRIPTION OF THE DRAWINGS

Two embodiments of the invention will now be described, by way of example only, with reference to the accompanying drawings in which.

DETAILED DESCRIPTION

Figure 1:
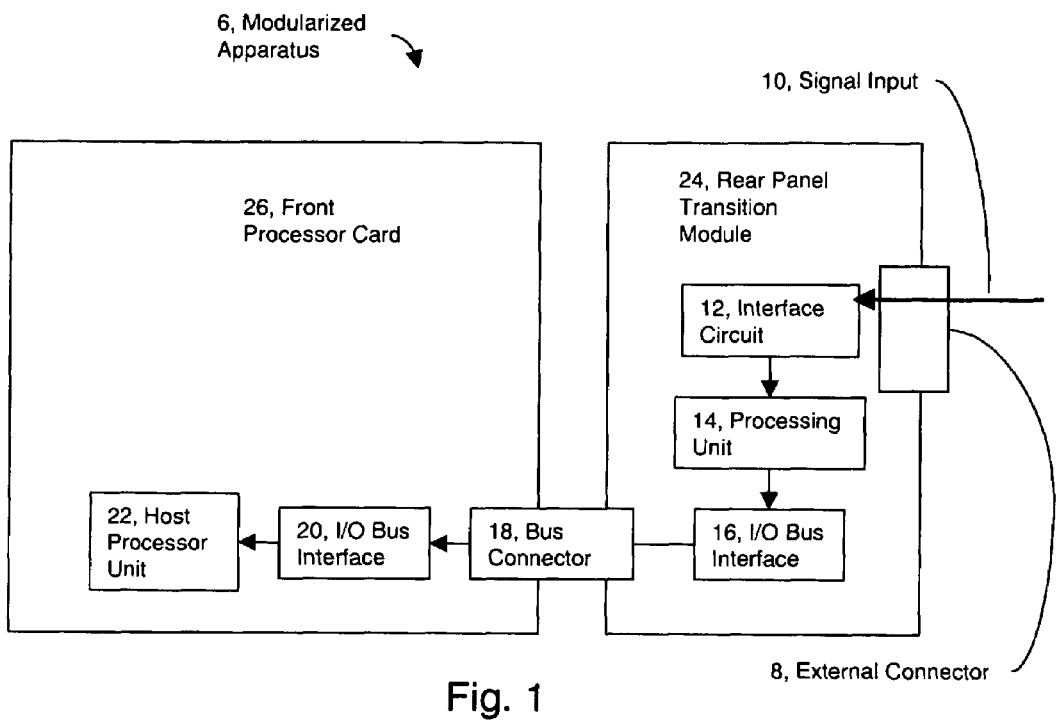
FIG. 1 is a schematic diagram of an active rear transition module of a first embodiment of the invention connected to a backplane.
Figure 2:
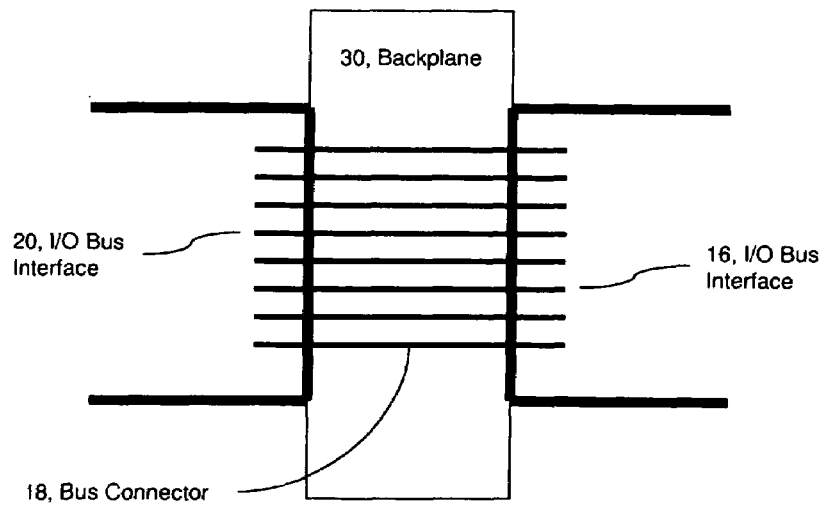
FIG. 2 is a schematic diagram of the backplane of FIG. 1 showing a feed-through connector.

As shown in FIGS. 1 and 2, a first embodiment of the present invention provides a rear panel transition module 24 having a compact Peripheral Component Interconnect (CPCI) input/output (I/O) bus interface for connection with a rear side of a backplane 30. A modularised apparatus 6 comprising the rear transition module 24, a cPCI bus connector 18 and a front processor card 26 is shown in FIG. 1. The cPCI bus connector 18 is a standard J1 connector. The rear panel transition module 24 is a printed circuit board. (PCB) which comprises a user-defined connector 8 which is coupled to an interface circuit 12 provided on the rear panel transition module 24. The interface circuit 12 is coupled to at least one processing unit 14 and the processing unit 14 is, in turn, coupled to a cPCI I/O bus interface 16. The active rear transition module 24 is used for I/O connection between a telecommunications signal input 10 and a front processor card 26. The active rear transition module 24 is provided with at least one user-defined external connector 8 for I/O connection with a telecommunications signal input 10. The external connector 8 is therefore designed to be compatible with the carrier of the telecommunications signal. The input signal may be one of any standard telecommunications signals known in the art such as E1, T1, STM-1 or Ethernet. The input signal may therefore be transmitted over a copper twisted pair cable, coaxial cable or optical fibre. The external connector 8 may therefore be a BNC, D-type or an optical. SC/FC connector, for example.

The external connector 8 is coupled to the interface circuit 12 on the rear panel transition module 24. The interface circuit 12 is a standard circuit, known in the art. The interface circuit 12 is coupled to the processing unit 14, which may perform a filtering function. The processing and filtering executed by the processing unit 14 may vary depending upon the application of the modularised apparatus 6. However in the exemplary embodiment shown the active rear transition module 24 is used to monitor telecommunications signals within a Signalling System Seven (SS7) type network. The rear transition module 24 is provided with an input signal from a network interface, for example, E1, STM-1 or Ethernet interface, of an SS7 network. The input signal is converted from an optical to an electrical signal, if necessary, and coupled to the front processor card 26 which executes further processing of the collated message signals. The processing unit 14 is coupled to a first cPCI I/O bus interface 16. The first cPCI interface 16 can be connected to the cPCI bus connector 18, or J1 connector, which is provided on the backplane 30. The cPCI front processor card 26 is provided with a second standard cPCI I/O bus interface 20 coupled between the cPCI connector 18 and a host processor unit 22 provided on the front processor card 26, which executes the processing of the collated message signals to run network surveillance and trouble shooting applications. In this way the rear transition module 24 can be coupled to the front processor card 26.

The active rear transition module 24 may be configured to monitor any of E1, Ethernet, STM-1 or other standard type of telecommunications signals. The host processor unit 22 on the front card 26 may be used to process only a sample of the signalling links that may be carried by such a telecommunications signal. For example a standard E1 signal may be divided or multiplexed into 31 time slots each of which can transmit a message or portion of a data signal. A standard STM-1 signal comprises 63 E1 signals. The active rear transition module 24 can select signalling messages of interest from specific timeslots and only these specific signals will be coupled to the host processor unit 22 on the front processor card 26 for processing. The active rear transition module 24 therefore performs initial signal recovery of an STM-1 signal, converting the optical signal to an electrical signal. The processing unit 14 provided on the active rear transition module 24 also carries out deframing of the STM-1 signal to recover the tributary E1 channels. The E1 channels are also deframed or demultiplexed in order to recover and extract data from specific time slots of interest. The extracted data from individual time slots can then be reconstructed by the processing unit 14 to recover a message sequence. A message sequence of interest can then be coupled to the front processor card 26 via the cPCI I/O interface 16.

The cPCI bus connector 18 on the cPCI backplane 30 is used for the cPCI I/O bus interface 16 which is a 32-bit PCI bus. The cPCI bus connector 18 has pins defined for power and ground signals, allowing the rear transition module 24 to take power directly from the backplane 30. A "hot-swap" controller on the rear transition module 24 also provides the rear transition module 24 with live insertion support or "hot-swap" capability.

The backplane 30 is designed so that the PCI bus connector 18 passes straight through from the front to the rear of the chassis. The backplane 30 connects the cPCI bus interface 20 on the front processor card 26 to the cPCI I/O interface 16 on the rear transition module 24. The connection of the first and second cPCI I/O interface buses to the cPCI bus connector 18 on the backplane 30 is shown in FIG. 2. Some small deviations from the standard cPCI pin out allow for the PCI connection to be made by a straight through connection. This includes special routing of initialisation device select (IDSEL) and interrupt signals on the rear transition module 24. The cPCI I/O interface 20 on the front processor card 26 is standard. The backplane 30 can contain several, for example eight, cPCI bus connectors 18. Each cPCI bus connector 18 can connect a front processor card 26 to a single active rear transition module 24 in an adjacent rear slot via a "feed-through connector" on the backplane 30. As there is a direct connection between front (system slot) and rear (peripheral slot), there are some rules that the rear cards must follow for certain PCI signals, which differ from the standard cPCI specification. For example, IDSEL is a PCI signal which is used to provide a unique access to each logical slot on the cPCI bus connector 18 for configuration purposes. Each slot is given a unique address by connecting one of the address lines (AD31 through AD24) to each slot's IDSEL pin. The Compact PCI standard requires that the backplane 30 shall connect the IDSEL pin on each peripheral slot to the appropriate address line and that the IDSEL pin on the System (front) slot should be grounded. These are conflicting requirements when a feed-through connector is used.

Figure 3:
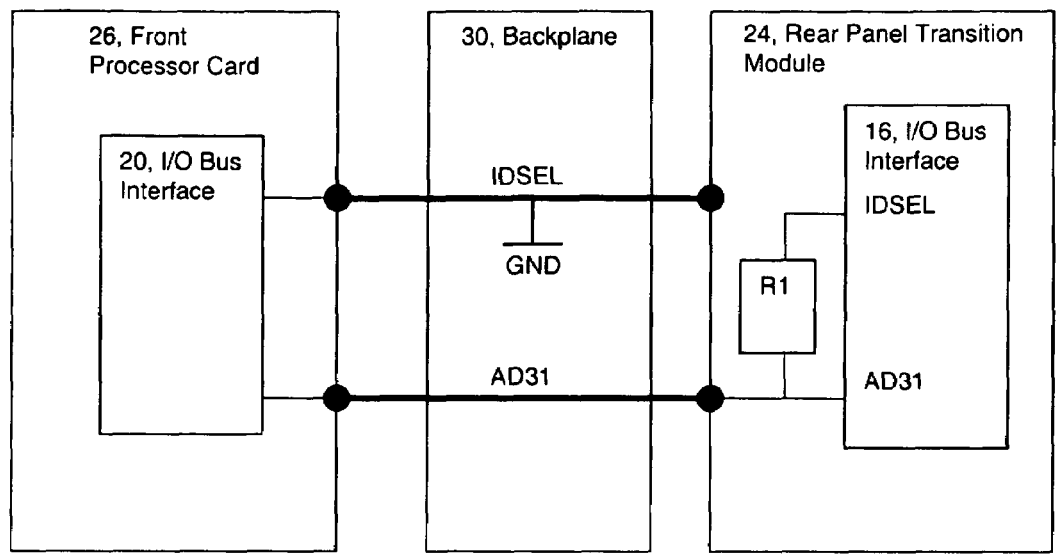
FIG. 3 is a schematic illustrating connections between the active rear transition module of the first embodiment of the invention and a front processor card via a backplane.

FIG. 3 is a schematic illustrating how the IDSEL signal can be connected between the active rear transition module 24 of the first embodiment of the invention and a standard front processor card 26 via the backplane 30. On the active rear transition module 24, the IDSEL input on the PCI interface 16 is connected to AD31 address line through a 1 K ohm resistor R1. In this embodiment the resistor R1 is provided on the active rear transition module 24. In other embodiments it is envisaged that the IDSEL pin on the PCI interface 16 may be connected to the backplane 30 via an optional link provided on the active rear transition module 26.

The "feed-through" nature of the pins of the backplane 30 may make it necessary for interrupt signal assignment to be carried out on the active rear transition module 24. The cPCI specification defines four interrupt signals, INTA# to INTD#. The backplane 30 is required to rotate the interrupt assignments through the logical board slots to provide a unique PCI interrupt to each board for the first four peripheral slots.

Figure 4:
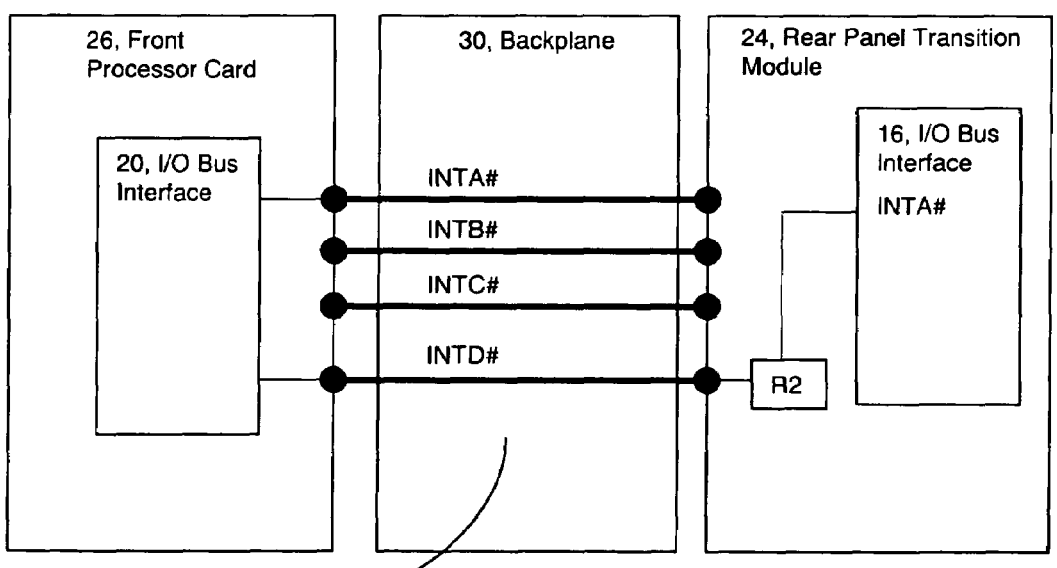
FIG. 4 is a schematic diagram demonstrating interrupt signal assignment on the rear transition module of the first embodiment.
Figure 5:
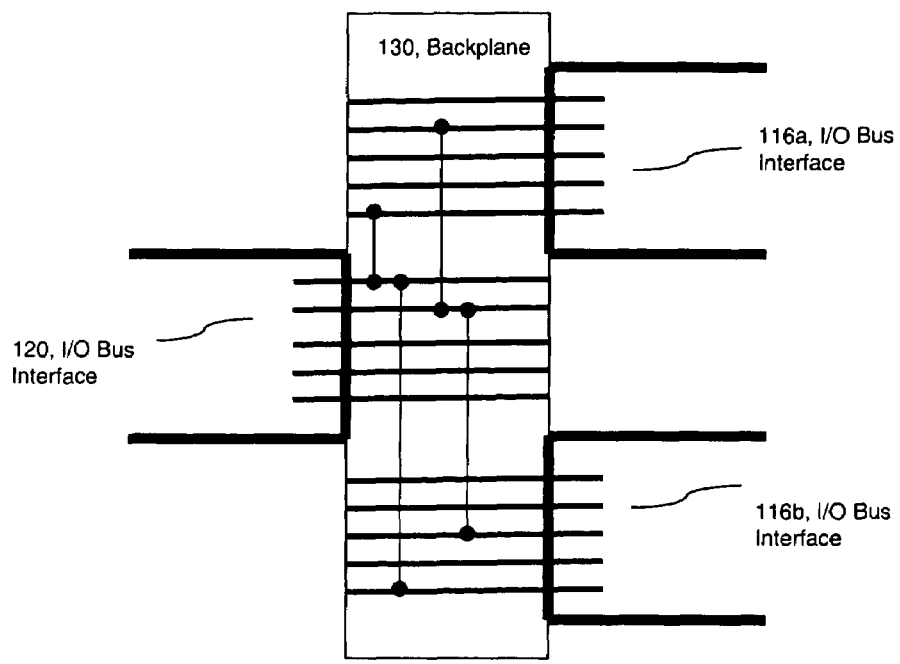
FIG. 5 is a schematic diagram of an active rear transition module of a second embodiment of the invention connected to a backplane.

The active rear transition module 24 is always in the first peripheral slot (IDSEL=AD31). Therefore the INTA# pin on the RTM 24 should connect to the INTD# signal on the system (front) slot. However, this cannot be done on the backplane 30 of the illustrated embodiment, owing to the feed-through nature of the pins of the backplane 30. Therefore the Interrupt assignment is done on the active rear transition module 24, as shown in FIG. 4. The INTA# signal on the active rear transition module 24 is coupled, by an optional link R2, to the INTD# pin on the backplane 30 as indicated in FIG. 4. The use of an optional link R2 offers the additional functionality that the rear transition module 24 of the present invention can be easily adapted for use with a backplane having multiple-peripheral slots. In other embodiments of the invention a number of additional optional links may be placed on the PCB rear transition module 24 to allow for adaptive connecting and increased functionality. For example an optional link between INTA# on the backplane 30 and INTA# on the PCI bus. I/O interface connector 16 can accommodate the use of a backplane with multiple peripheral slots.

A second embodiment of the invention will now be described by way of example only. Similar reference numerals to those used to represent features of the first embodiment will be used to represent features of the second embodiment but will be raised by a factor of '100'. In this embodiment the backplane 130 is designed to support multiple active rear transition modules 124 on a single PCI bus connector 118. In the second embodiment the front and rear cards are offset, so that the first and second cPCI I/O interfaces 120 and 116a, 116b are offset. This allows signals to be routed more flexibly on the PCB backplane 130.

Figure 6:
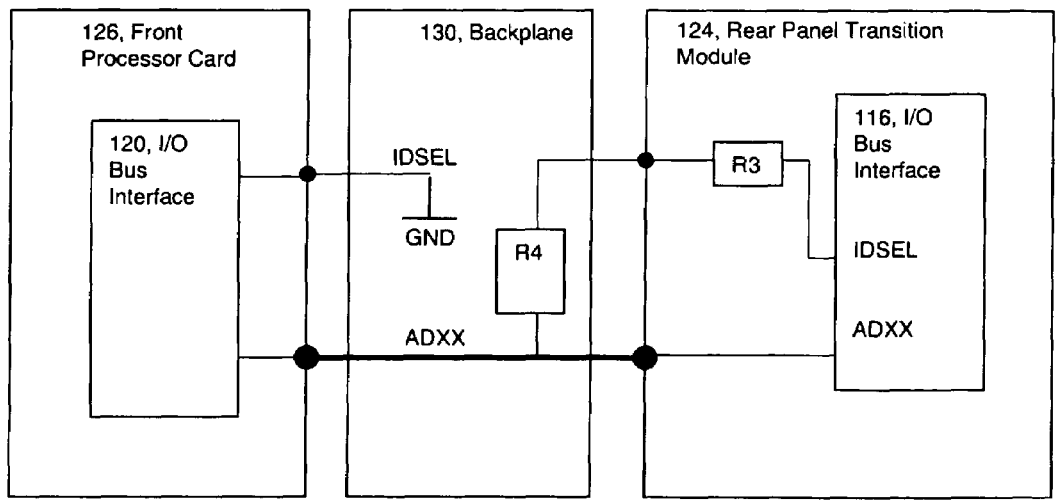
FIG. 6 is a schematic diagram illustrating connections between the active rear transition module of the second embodiment of the invention and a front processor card via a backplane.

FIG. 6 shows how IBSEL signals are connected in the second embodiment of the invention When a backplane 130 with multiple peripheral slots is used. The backplane 130 is connected to the IDSEL input on the rear card 124 via a 1 K ohm resistor R4 provided on the PCB backplane 130. An optional link R3 may be provided on the PCB of the active rear transition module 124 between the IDSEL pin on the rear transition module 124 and the IDSEL input of the backplane 130. The IDSEL pin on the front cPCI bus interface 120 is coupled to ground. Furthermore the optional link R1 connected to INTD# in the first embodiment is removed and a link is provided between the INTA# pin on the backplane 130 and the INTA# pin on the rear transition module 124.

Although only two particular embodiments of the present invention have been described in detail, it will be apparent to one skilled in the art that various changes may be made without departing from the scope of the present invention.

What is claimed is:

1. A rear panel transition module having a standard compact Peripheral Component interconnect (cPCI) input/output (I/O) bus interface coupled to a standard J1 connector for connection to a rear side of a backplane having a cPCI bus connector conforming to the cPCI bus standard, the rear panel transition module further comprising:
   an external connector having an input for receiving input signals,
   an interface circuit coupled to the external connector;
   at least one processing unit coupled between the interface circuit and the standard cPCI I/O bus interface; and
   an interrupt assignment link for optionally coupling one of four interrupt lines from the cPCI bus connector to an interrupt signal on the rear panel transition module.

2. A rear panel transition module according to claim 1, further comprising a controller to support live insert functionality (hot-swap).

3. A rear panel transition module according to claim 1, wherein the external connector is any one of BNC, D-type or SC/FC.

4. A rear panel transition module according to claim 1, wherein the at least one processing unit performs initial filtering and/or processing of a signal input.

5. A transition module having an input/output (I/O) bus interface coupled to a connector for connection to a backplane having a bus connector, the transition module further comprising:
   an external connector having an input for receiving input signals;
   an interface circuit coupled to the external connector;
   at least one processing unit coupled between the interface circuit and the I/O bus interface; and
   an interrupt assignment link for optionally coupling one of four interrupt lines from the cPCI bus connector to an interrupt signal on the rear panel transition module.

6. A modularised card apparatus a backplane having a rear side and a front side and conforming to the cPCI bus standard, the backplane having a cPCI bus connector, the modularised card apparatus comprising:
   a front processing card having a processing unit and a first cPCI input/output (I/O) bus interface for connecting to a slot on the front side of the backplane; and
   a rear transition module having:
      a second cPCI I/O bus interface coupled to a standard J1 connector for connecting to a rear slot on the rear side of the backplane;
      an external connector having an input for receiving input signals;
      an interface circuit coupled to the external connector;
      at least one processing unit coupled between the interface circuit and the second cPCI I/O bus interface; and
      an interrupt assignment link for optionally coupling one of four interrupt lines from the cPCI bus connector to an interrupt signal on the rear panel transition module.

7. A modularised card apparatus according to claim 6 wherein the front processing card has no external connection provided thereon.

8. A modularised card apparatus according to claim 6, wherein the cPCI bus connector on the backplane is a feed-through connector.

9. A modularised card apparatus according to claim 8 wherein the rear transition module further comprises a resistive electrical connection between an IDSEL input on the second cPCI I/O bus interface and an appropriate address line.

10. A modularised card apparatus according to claim 8, wherein a resistive electrical connection is provided on the rear transition module between an INTA# pin on the second cPCI I/O bus interface and an INTD# pin on the rear side of the backplane.

11. A modularised card apparatus according to claim 6, wherein the backplane comprises a plurality of slots on the rear side.

12. A modularised card apparatus according to claim 11 wherein an IDSEL input on the second cPCI I/O bus interface is connected to an appropriate address line via a resistive electrical connection provided on the backplane.

13. A modularised card apparatus according to claim 12 wherein the IDSEL pin on the first cPCI I/O bus interface is connected to a ground plane.

14. A modularised card apparatus comprising:
   a backplane having a first side and a second side, the backplane having a bus connector;
   a processing card having a processing unit and a first input/output (I/O) bus interface for connecting to a slot on the second side of the backplane; and
   a transition module having a second I/O bus interface coupled to a connector for connecting to a slot on the first side of the backplane, the transition module including:
   an external connector having an input for receiving input signals;
   an interface circuit coupled to the external connector;
   at least one processing unit coupled between the interface circuit and the second I/O bus interface; and
   an interrupt assignment link for optionally coupling one of four interrupt lines from the cPCI connector to an interrupt signal on the rear panel transition module.

* * * * *

UNITED STATES PATENT AND TRADEMARK OFFICE
CERTIFICATE OF CORRECTION

PATENT NO. : 7,299,312 B2  Page 1 of 1
APPLICATION NO. : 10/939088
DATED : November 20, 2007
INVENTOR(S) : McKeown It is certified that error appears in the above-identified patent and that said Letters Patent is hereby corrected as shown below:

On the title page, item (54), in column 1, line 1, delete "TELECOMMUNICATION" and insert -- TELECOMMUNICATIONS --, therefor.

In column 1, line 1, delete "TELECOMMUNICATION" and insert -- TELECOMMUNICATIONS --, therefor.

In column 7, line 37, in Claim 6, after "apparatus" insert -- with --.

Signed and Sealed this

Sixth Day of May, 2008

JON W. DUDAS
*Director of the United States Patent and Trademark Office*